US010246270B2

(12) United States Patent
Balletti et al.

(10) Patent No.: US 10,246,270 B2
(45) Date of Patent: Apr. 2, 2019

(54) TRANSFER UNIT FOR TRANSFERRING ARTICLES BETWEEN TWO LINES ANGULARLY DISPOSED TO EACH OTHER

(71) Applicant: CT PACK S.R.L., Valsamoggia (Bologna) (IT)

(72) Inventors: Leonardo Balletti, San Lazzaro di Savena (IT); Gabriele Canini, San Giorgio di Piano (IT)

(73) Assignee: CT PACK S.R.L., Valsamoggia (Bologna) (IT)

( * ) Notice: Subject to any disclaimer, the term of this patent is extended or adjusted under 35 U.S.C. 154(b) by 0 days.

(21) Appl. No.: 15/706,016

(22) Filed: Sep. 15, 2017

(65) Prior Publication Data

US 2018/0079602 A1   Mar. 22, 2018

(30) Foreign Application Priority Data

Sep. 19, 2016   (IT) .......................... 202016000093845

(51) Int. Cl.
| | | |
|---|---|---|
| B65B 35/36 | (2006.01) | |
| B65G 47/84 | (2006.01) | |
| B65G 47/244 | (2006.01) | |
| B65G 47/91 | (2006.01) | |
| B65G 47/53 | (2006.01) | |
| B65B 65/02 | (2006.01) | |
| B65B 35/46 | (2006.01) | |
| B65B 35/56 | (2006.01) | |

(52) U.S. Cl.
CPC ............ *B65G 47/848* (2013.01); *B65B 35/36* (2013.01); *B65B 65/02* (2013.01); *B65G 47/244* (2013.01); *B65G 47/53* (2013.01); *B65G 47/918* (2013.01); *B65B 35/46* (2013.01); *B65B 35/56* (2013.01)

(58) Field of Classification Search
CPC .... B65G 47/848; B65G 47/244; B65G 47/53; B65G 47/918
USPC .......................... 198/377.04, 377.08, 377.02
See application file for complete search history.

(56) References Cited

U.S. PATENT DOCUMENTS

| | | | | |
|---|---|---|---|---|
| 3,868,009 | A * | 2/1975 | Billi ..................... | B65G 47/847 198/377.05 |
| 4,883,163 | A * | 11/1989 | Gamberini ............. | B65G 47/32 198/377.04 |
| 5,381,884 | A * | 1/1995 | Spatafora ............. | B65G 47/848 198/430 |

(Continued)

*Primary Examiner* — William R Harp
(74) *Attorney, Agent, or Firm* — Shuttleworth & Ingersoll, PLC; Timothy Klima (57) ABSTRACT

A transfer unit for transferring articles having a first orientation from a first line, to a perpendicular second line along which the articles advance with a second orientation, rotated in the horizontal plane relative to the first orientation, includes a carousel having a set of pickup devices carried by rotatably supported arms driven in counter-rotation and phase relationship with the rotation direction of the carousel. Counter-rotation is obtained by idler gears meshing with a crown wheel coaxial with and fixed to the carousel and with gears acting on the arms. The gripping devices are driven in counter-rotation relative to rotation of the arms to keep their orientation constant in the horizontal plane while free ends of the arms rotate. Counter-rotation of the pickup devices is obtained by a first pinion connected by a belt to a second, smaller pinion fixed on the axis of rotation of the arm.

17 Claims, 10 Drawing Sheets

(56) References Cited

U.S. PATENT DOCUMENTS

| | | | | |
|---|---|---|---|---|
| 5,901,530 A * | 5/1999 | Draghetti | ............. | B65G 47/244 198/471.1 |
| 5,988,354 A * | 11/1999 | Spatafora | ............... | B65G 29/00 198/374 |
| 6,109,419 A * | 8/2000 | Spatafora | ............. | B65G 47/848 198/377.04 |
| 6,311,824 B1 * | 11/2001 | Van Pul | ............... | B65G 47/848 198/370.12 |
| 8,006,825 B2 * | 8/2011 | Lenherr | ................ | B65G 29/00 198/377.07 |
| 2013/0248325 A1 * | 9/2013 | Michler | ............... | B65G 47/682 198/379 |
| 2018/0127218 A1 * | 5/2018 | Kalany | ................. | B65G 47/32 |

* cited by examiner

TRANSFER UNIT FOR TRANSFERRING ARTICLES BETWEEN TWO LINES ANGULARLY DISPOSED TO EACH OTHER

This application claims priority to Italian Patent Application 202016000093845 filed Sep. 19, 2016, the entirety of which is incorporated by reference herein.

BACKGROUND OF THE INVENTION

This innovation relates to a machine for packaging miscellaneous articles and, more specifically, regards a unit for transferring articles between two conveyor lines which are angularly disposed to each other (preferably at 90°).

The articles transported from one zone to another to undergo further processing must very often be transferred from a first conveyor line to a second conveyor line at right angles to each other.

Several devices are known which are capable of transferring articles from one line to another on condition that the articles are placed in proximity to the point of transfer between the two lines.

These devices generally comprise carrier units provided with pickup devices, normally vertically movable suction cups which are lowered onto the first line to pick up the articles and then rotated on a carousel which moves them over the second line where they deposit the articles previously picked up.

Prior art devices, however, have limitations which differ in their effect on the production speed of the packaging plant.

In some cases, after being transferred to the second line, the orientation of the articles on the second line must be different from the orientation they had on the first line.

For example, on the first line, the articles may be made to advance in the direction of their long side and then placed side by side on the second line where they advance in the direction of their short side, rotated through an arc of 90° on the carousel carrying them.

Another need which is felt is that of avoiding scraping when the articles are picked up and released by the pickup means on account of the substantial difference in speed of the carousel and the first and second lines, as well as the rotation which the pickup means undergo as a result of the carousel rotating when they are lowered onto the articles.

SUMMARY OF THE INNOVATION

The aim of this innovation is to provide a transfer unit for transferring articles between two lines at right angles to each other to overcome the above mentioned drawbacks.

More specifically, this innovation has for an aim to propose a transfer unit which is capable of overcoming the problems due to the speed differences between the first and second lines.

Another aim is to provide a transfer unit which is capable of rotating the articles by 90 degrees about their direction of feed along the lines during the rotation of the carousel.

This innovation accordingly proposes a transfer unit having features disclosed herein.

BRIEF DESCRIPTION OF THE DRAWINGS

The innovation will now be described with reference to the accompanying drawings which illustrate a preferred, non-limiting embodiment of it and in which.

DESCRIPTION OF THE PREFERRED EMBODIMENTS

With reference to the figures listed above, the numeral 100 denotes in its entirety the transfer unit forming the object of this innovation.

The transfer unit 100 is designed to be operatively located at the meeting point between the two conveyor lines (10, 20), which are at right angles to each other and between which the articles must be transferred.

It should be noted, therefore, that the two lines (10, 20) are angularly disposed to each other (preferably at 90°).

Figure 3:
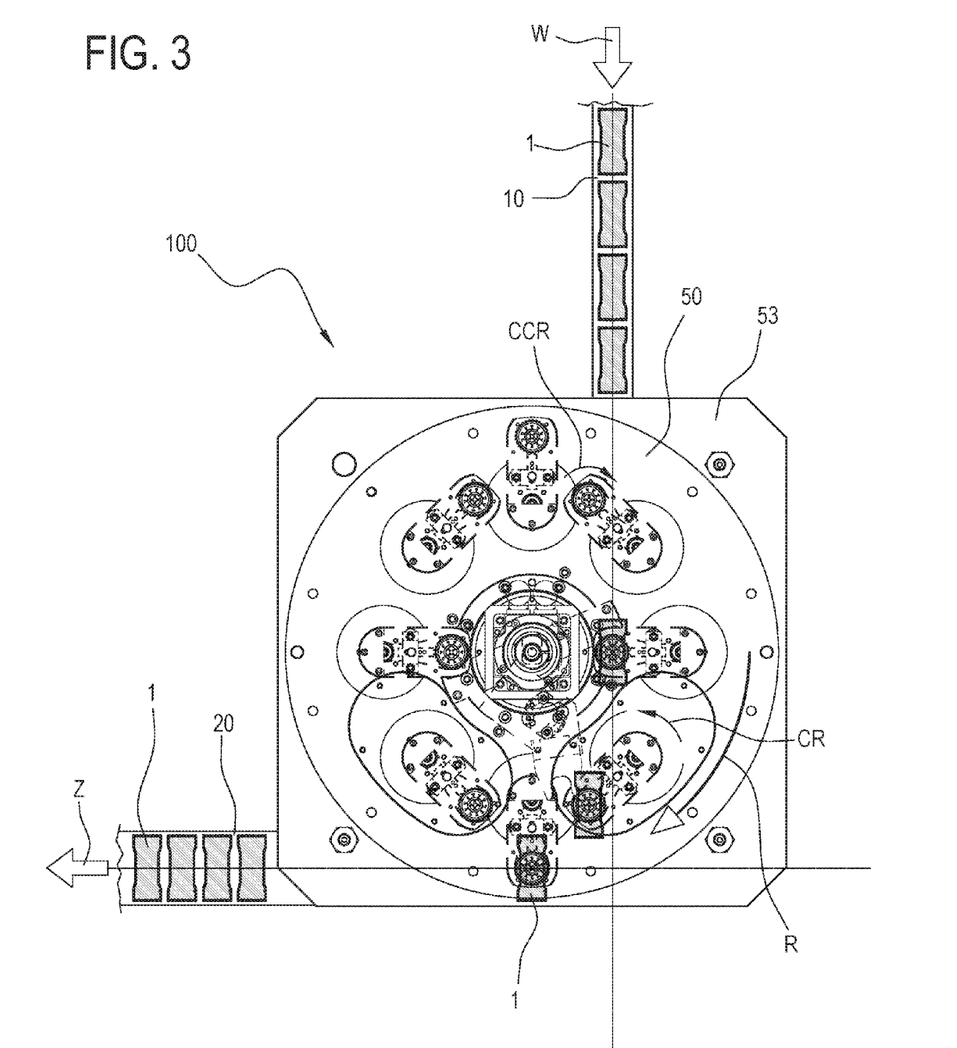
FIG. 3 schematically illustrates the transfer unit operatively located at the meeting point between the two lines, which are at right angles to each other and between which the articles must be transferred.
Figure 4:
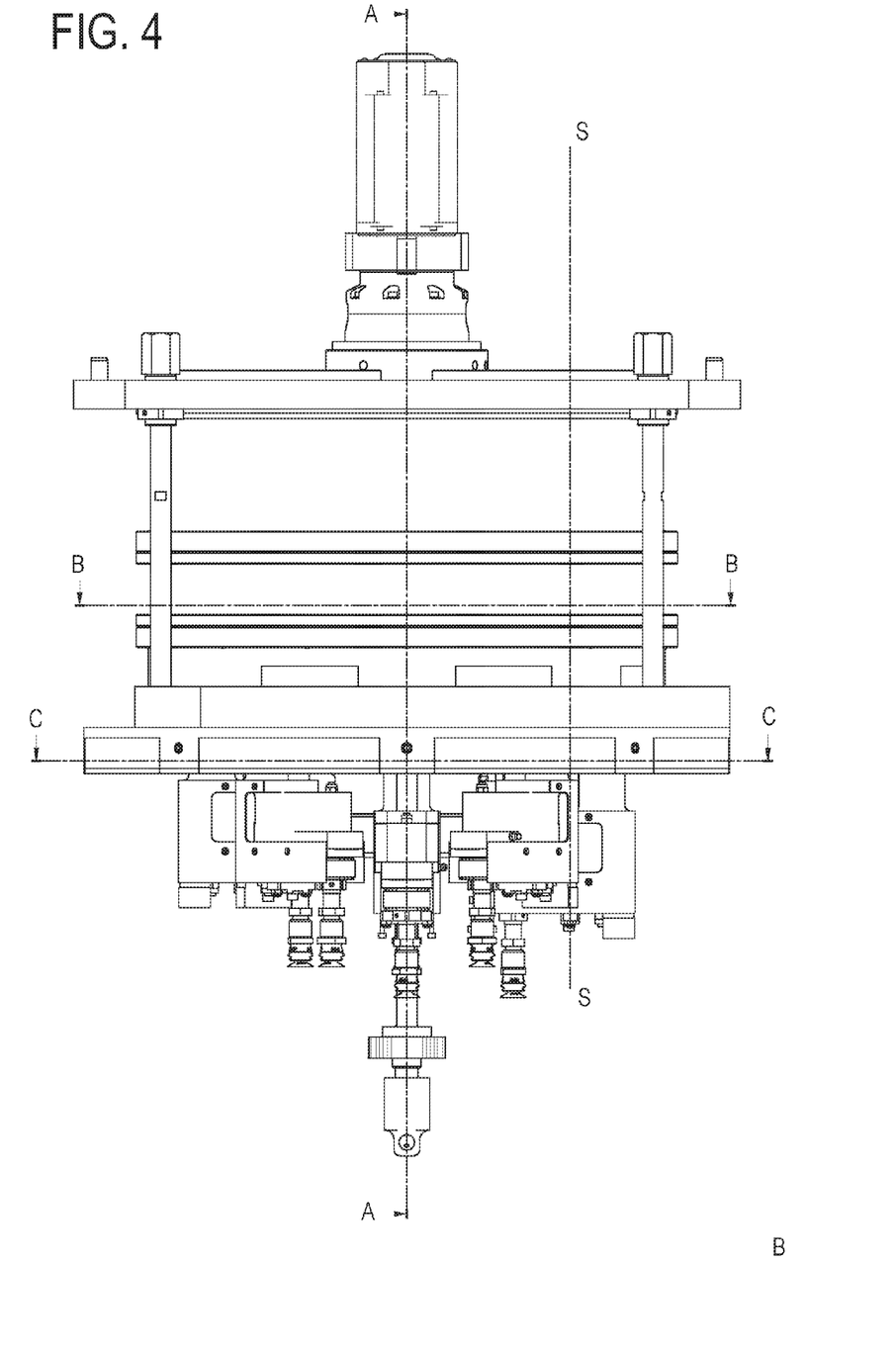
FIG. 4 shows the transfer unit in a side view.

For example, FIG. 3 illustrates a first line 10 along which the articles 1, arranged in a row for example, are transported in the direction of movement W, and a second line 20 which carries the articles 1 elsewhere, after they have been transferred, in the away direction of movement Z.

During transfer, the articles 1, which are illustrated schematically in the shape of parallelepipeds, must be kept in the same horizontal plane in such a way that the orientation of displacement relative to the direction of movement of the two lines undergoes rotation through 90°.

In effect, on the second line 20, the articles are placed side by side and move in the away direction Z.

In other words, on the first line 10, the long side of each article 1 is parallel to the feed direction of the first line 10, whereas on the second line 20, the long side is at right angles to the feed direction of the second line 20.

For this reason, it is evident that the operating (feed) speed of the second line 20 is lower than the operating (feed) speed of the first line 10.

Figure 1:
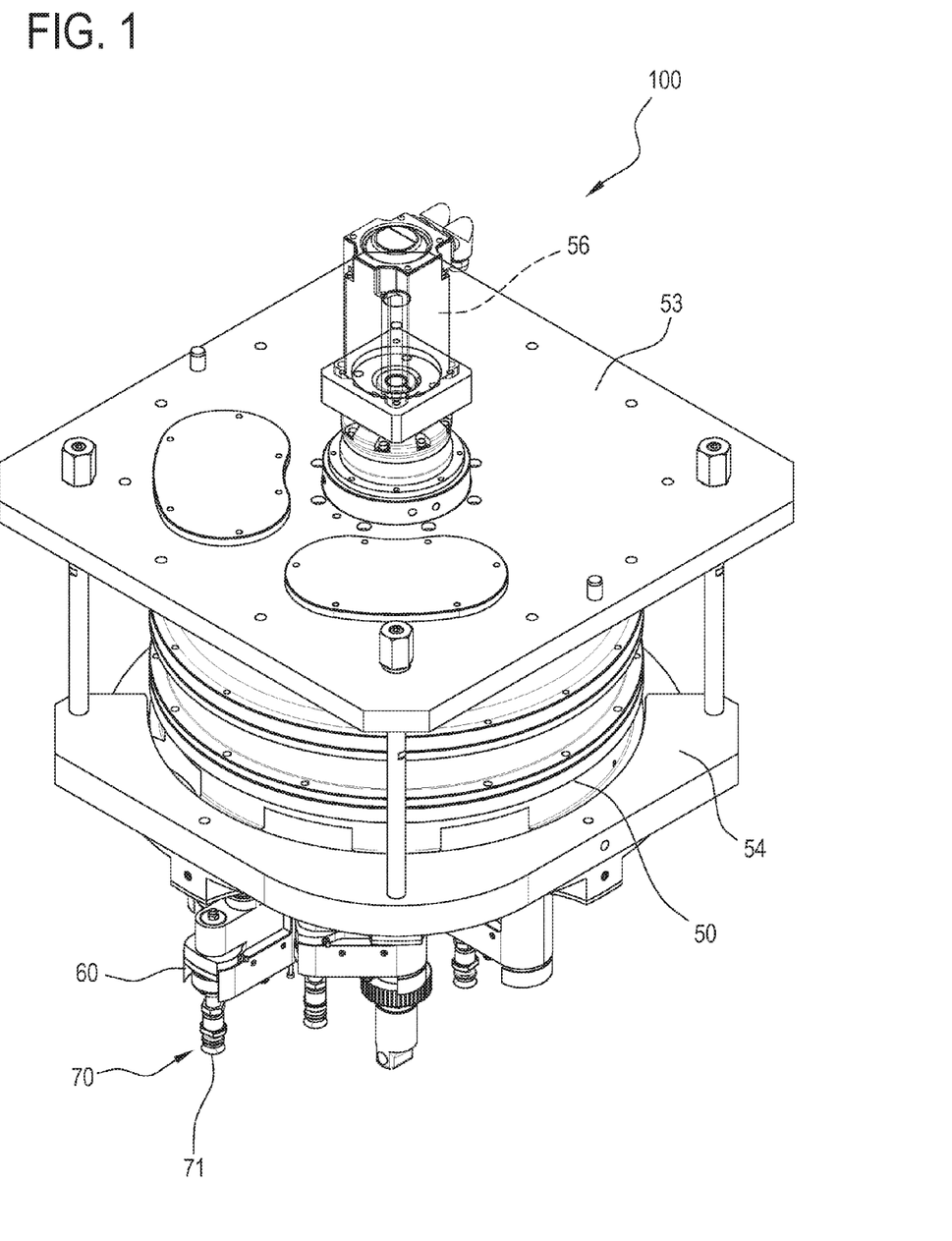
FIG. 1 shows a partly lateral elevation view of the transfer unit forming the object of this disclosure.

The transfer unit 100 comprises a rotary carousel 50, driven in rotation about a vertical axis A-A by a motor 56 (FIG. 1).

The carousel 50 is equipped with a set of pickup means 70 which are circumferentially distributed thereon and which substantially consist of suction cups 71.

More in detail, the pickup means 70 are mounted on corresponding arms 60 which are in turn rotatably supported by the carousel 50.

In other words, it should be noted that each arm 60 rotates about a respective (vertical) axis, where the axis is disposed at a predetermined radial distance from the axis A-A.

It should be noted that the axis of rotation of each arm 60 is driven in rotation when the carousel 50 rotates.

Each of the arms 60 is radially fixed to the free bottom end of a corresponding tubular support 61 through which a stem 62 passes.

Figure 2:
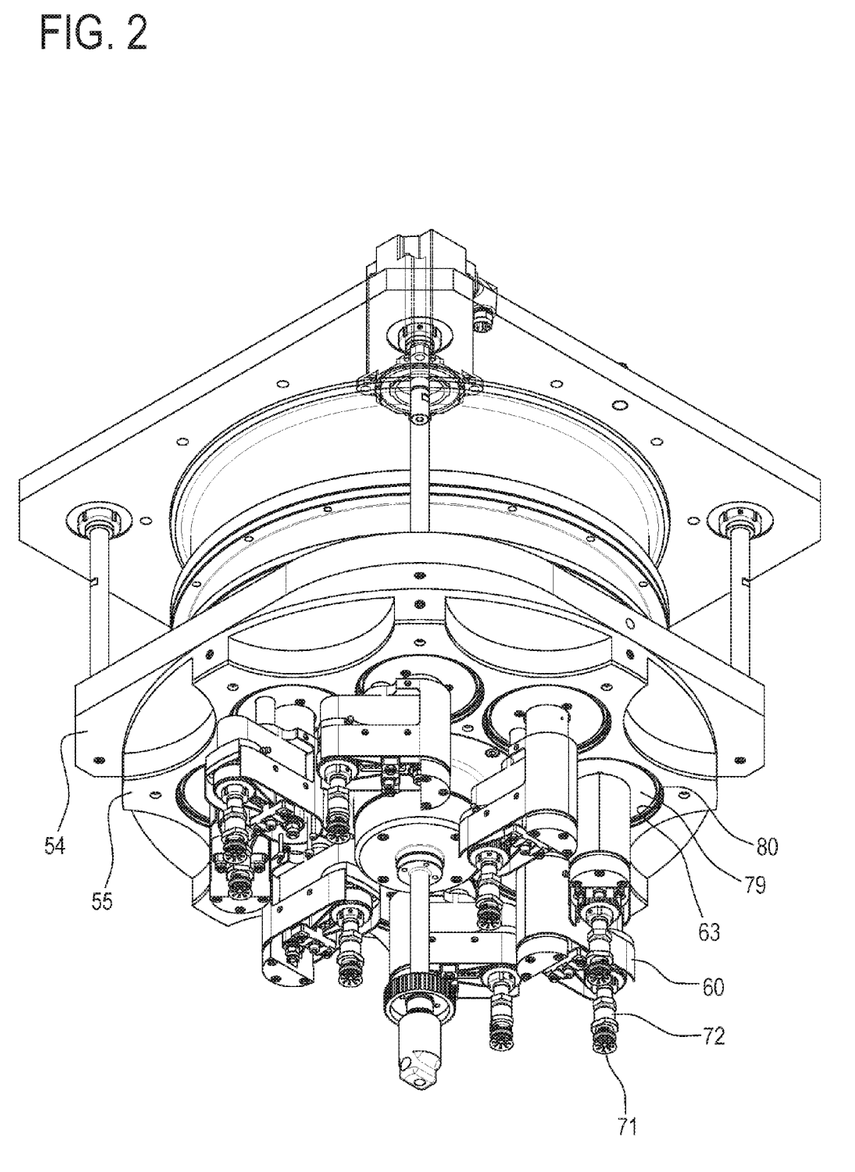
FIG. 2 shows the transfer unit of FIG. 1 viewed from below and partly from one side.

The stem 62 sustains the tubular support 61 and is inserted with its top section, together with the tubular support 61, into a corresponding hole 63 made in the bottom section of the carousel 50, specifically in a base plate 55 thereof (FIG. 2).

That way, the tubular support 61 can rotate on the stem 62, thereby causing the respective arm 60 to rotate.

Figure 9:
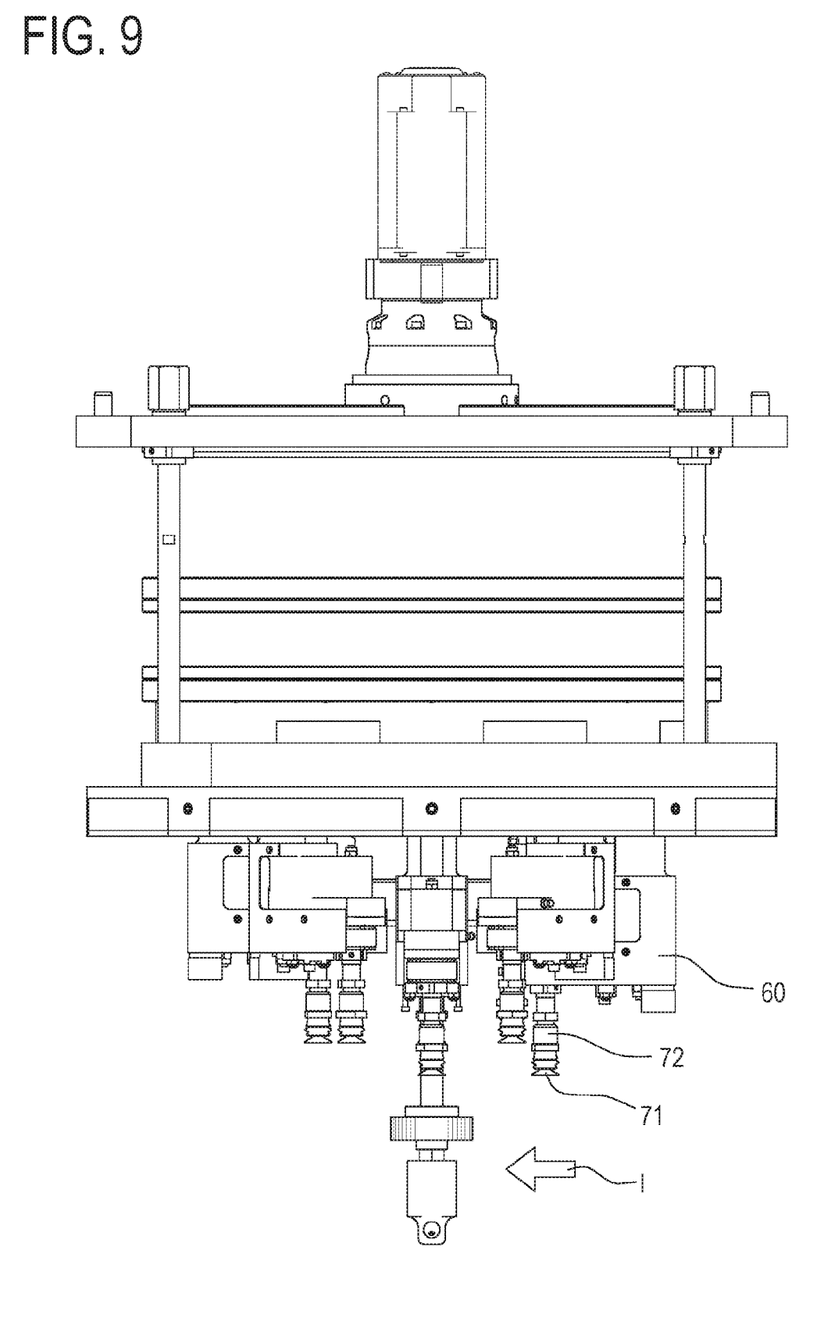
FIG. 9 shows the transfer unit in a side view.
Figure 10:
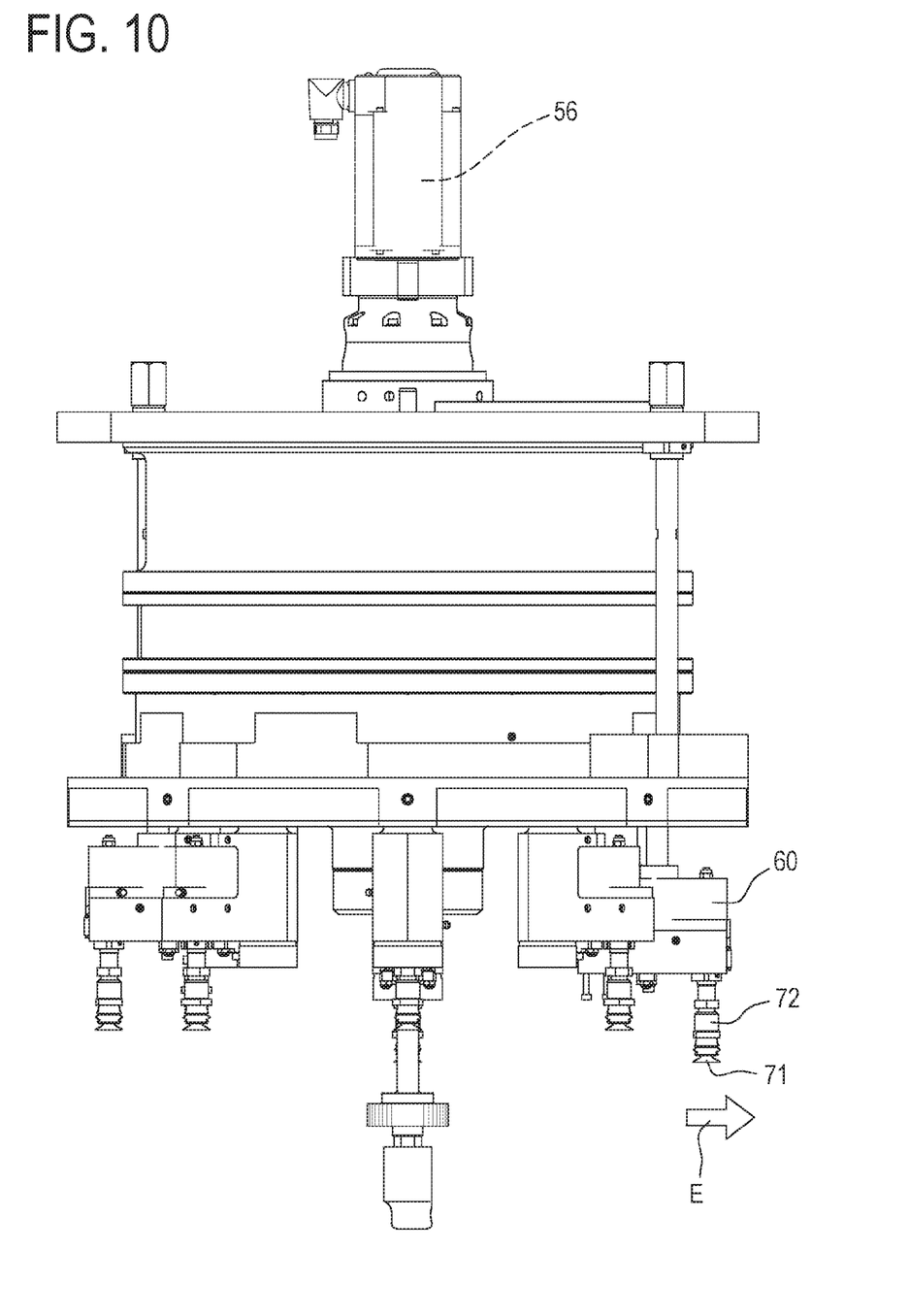
FIG. 10 shows the transfer unit in a side view in a different operating step.

The holes 63, and hence the tubular supports 61, are arranged along the base plate 55, and hence relative to the carousel 50, in such a way as to extend round a middle circle, concentric with the carousel 50, so that when the arm 60 rotates, the pickup means 70 are arranged first round an inner ideal circle of the carousel 50 (condition I of FIG. 9) and then round an outer ideal circle of the carousel 50 (condition E of FIG. 10).

The tubular support 61 has keyed to it, on the inside of the carousel 50, a gear 65 which, through an idler gear 66, engages a crown wheel 67 that is coaxial with, and fixed to, the carousel 50.

This gear connection is such that the rotation R of the carousel 50, besides rotating the stems 62, the tubular supports 61 and the arms 60 with the pickup means 70, also causes, thanks to the idler gear 66, the counter-rotation CR, that is, the rotation of the tubular support 61, and hence of the respective arm 60, about the stem's axis S-S in the direction of rotation opposite to the direction of rotation R of the carousel 50.

Further, the reduction gear ratio between the idler gear 66 and the crown wheel 67 and/or the gear 65 keyed to the tubular support 61 is such that each rotation of the carousel, for example clockwise, corresponds to a complete rotation of the arm 60 in the opposite direction, that is, anticlockwise.

In other words, the unit 100 comprises a gear device interposed between the arms 60 and the carousel 50 and configured to allow the arms 60 to rotate in suitable phase about their respective axes of rotation when the carousel 50 is rotated.

The mutual arrangement of the carousel 50 and of the first and second conveyor lines 10 and 20 is such that, as a result of the aforementioned movement of the arms 60 in phase relationship with the rotation of the carousel 50 when the pickup means 70 are arranged round the inner ideal circle of the carousel 50 (condition I of FIG. 9), the arms are also aligned with the first line 10, whereas when they are arranged round the outer ideal circle of the carousel (condition E of FIG. 10), the arms are also aligned with the second line 20.

The effect of combining the counter-rotation CR of the tubular support 61 and, consequently, of the respective arm 60, with the rotation of the carousel 50 is such that the pickup means 70 of each arm 60, in the stretch in which an article 1 is picked up, has a rotation component which is parallel to the first line 10 (and whose speed is equal to or less than that of the latter).

In other words, the counter-rotation CR of the arm 60, when the latter is on the inner circle, is added to the rotation of the carousel which carries it in that stretch in the same direction, considering the component of the displacement which is parallel to the first line 10.

The differential sped of the pickup means 70 compared to the articles 1 on the first line 10 the moment they are picked up may be zero or, in any case, very low.

The same occurs, but in opposite direction, when the pickup means 70 are on the outer circle and the rotation speed of the arm 60 is subtracted from the rotation of the carousel 50 which carries it in that stretch in a different direction, considering the component of the displacement which is parallel to the second line 20.

In this case, too, the relative speed of the pickup means 70 is cancelled out relative to the second line 20 which, as mentioned above, operates at a lower speed than the first line 10.

It should be noted that the combined action of the synchronized movements of the carousel 50 and of the arms 60 thus causes the pickup means 70 to move along a substantially elliptical trajectory.

Figure 5:
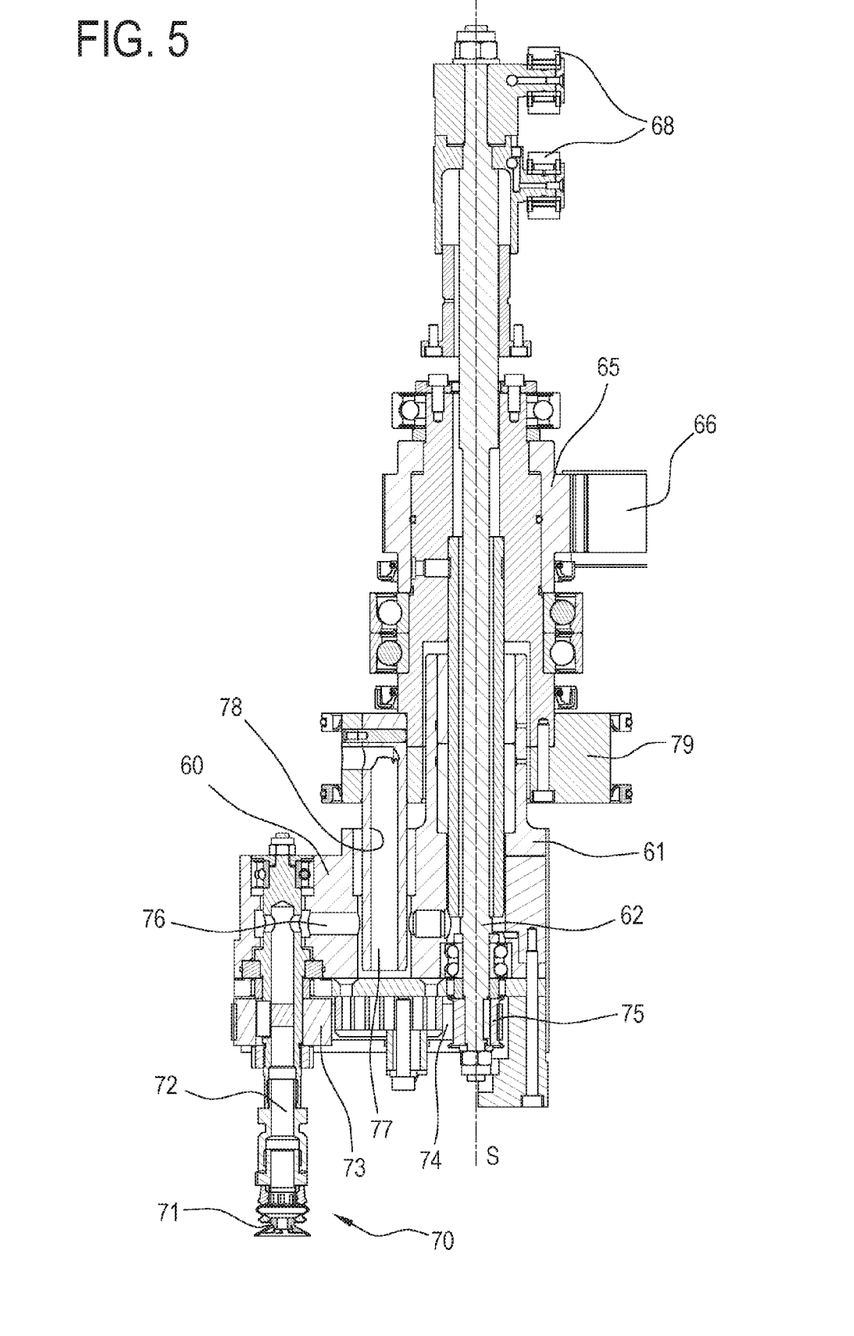
FIG. 5 is a detailed view showing one of the fundamental components of the transfer unit.
Figure 6:
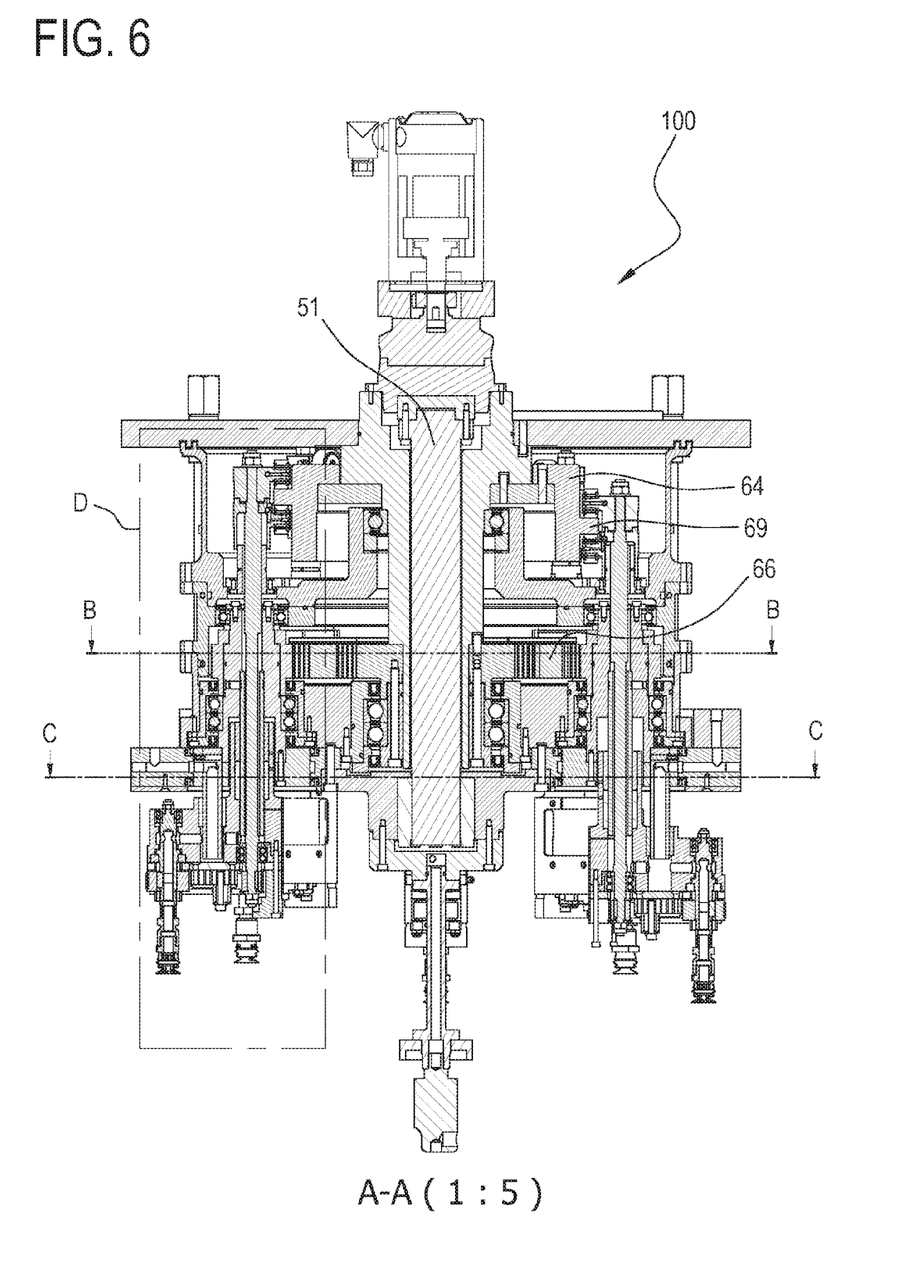
FIG. 6 is side cross section of the transfer unit, where the component illustrated in FIG. 5 appears in the box outlined by a dashed line.
Figure 7:
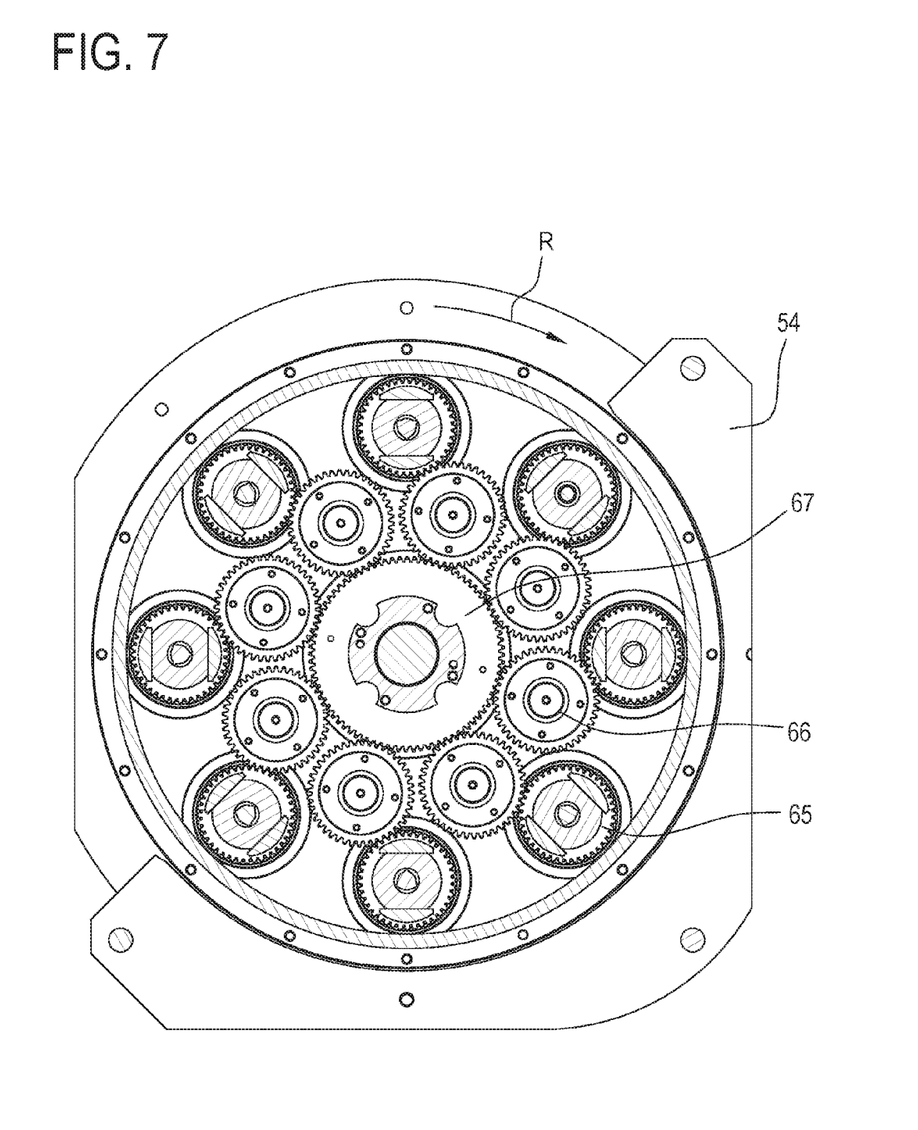
FIG. 7 is a plan view of the transfer unit in cross section through line B-B of FIGS. 4 and 6.

The top end of each stem 62 is then subjected to the action of a cam drum 64 (shown in FIG. 6) which engages it by means of a pair of bearings 68 mounted laterally thereon (shown in FIG. 5).

The rotation of the carousel 50 causes the bearings to slide along the cam 69, thereby making the stem 62 move vertically.

The phase relationship between the fixed cam 69 and the movable stems 62 causes the stems to be lowered when the pickup means 70 need to be moved close to the first line 10 to pick up the articles 1 and the stems 62 are then raised and lowered again to place the articles 1 on the second line 20.

The gripping means 70 are in turn driven in counter-rotation CCR relative to the rotation of the respective arms 60 in such a way as to keep their orientation constant in the horizontal plane while the free end of the arm 60 rotates.

More in detail, the pickup means 70 consist of suction cups 71, each connected to a sleeve 72 which is rotatably mounted on the free end of the corresponding arm 60.

The sleeve 72 has keyed to it a first pinion 73 connected by a toothed belt 74 (shown in FIG. 5 and in FIG. 2) to a second, smaller pinion 75 fixed in the horizontal plane relative to the carousel 50 and concentric with the axis of rotation of the arm 60.

In practice, the second pinion 75 is fixed stably to the lower end of the respective stem 62 so it does not rotate on itself.

Thus, the rotation of the arm 60 causes a counter-rotation CCR of the first pinion 73 by an amount such as to compensate the rotation of the sleeve 72 due to the rotation of the arm, from which the effect of the rotation of the carousel 50 is subtracted.

The result is that the article 1 is kept in the same position in the horizontal plane during transfer (see FIG. 3) and is then placed on the second line 20 beside the article 1 previously transferred.

In practice, the pickup means 70 driven in rotation by the carousel 50 are driven to pick up the articles 1 one after the other from the first line 10 and, after rotating the carousel 50 through a circular arc of 90°, to place them on the second line 20.

The suction cups 71 are connected to the respective sleeves 72 which produce the suction effect therein.

In effect, each sleeve 72 is connected to an internal hole 76 which extends into the arm 60 and is closed at both ends.

The internal hole 76 is connected to a duct 77 which is inserted slidably into a sealed hole 78 made in the respective arm 60 in such a way as to allow the latter to make vertical movements.

The duct 77 leads into a bushing 79 which is mounted rotatably about an axis of rotation concentric with the axis of rotation of the arm 60 in a circular chamber 80, thereby creating a sealed effect.

Figure 8:
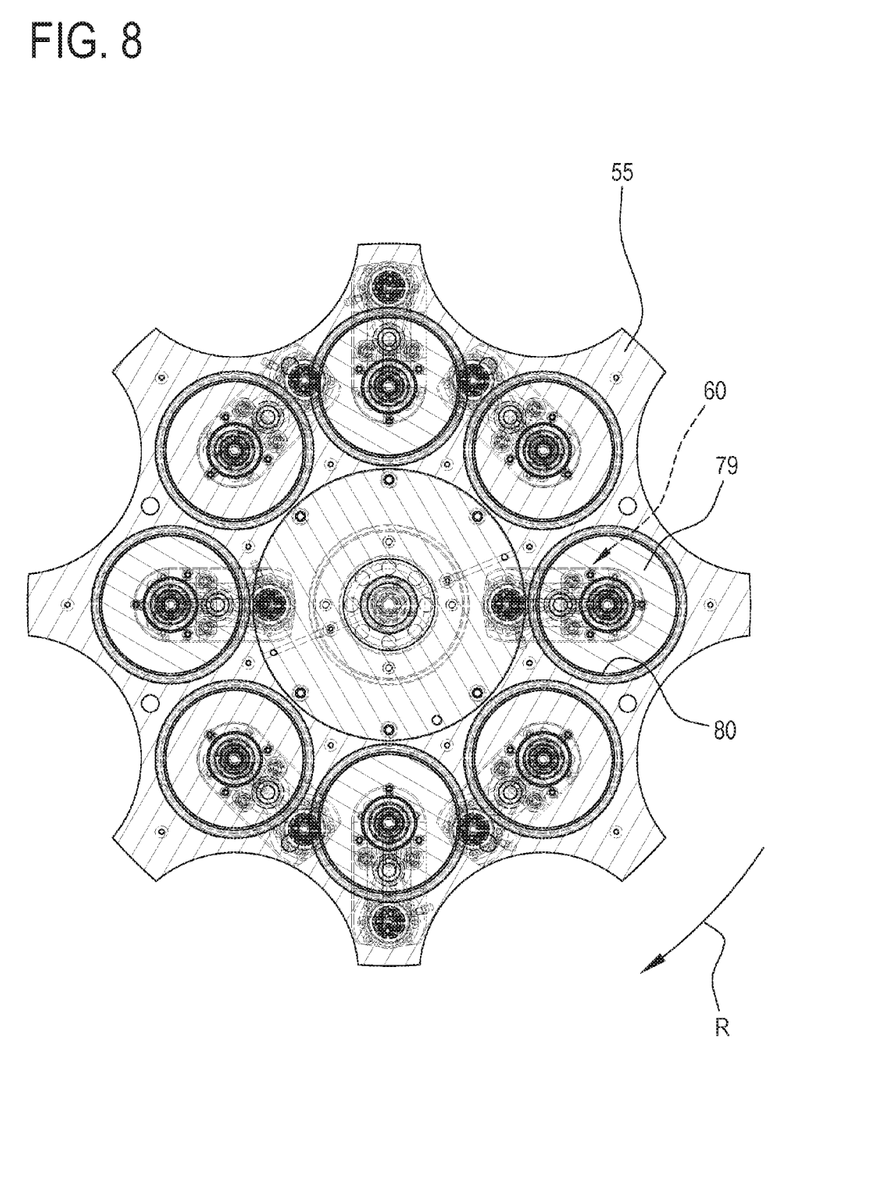
FIG. 8 is a plan view of the transfer unit in cross section through line C-C of FIGS. 4 and 6.

The circular chambers 80 are made in the base plate 55 (FIG. 8) at the bottom of the carousel 50 and are concentric with the axis of rotation of the respective arms 60, hence with the stems 62.

Thanks to ducts made in the carousel 50, a negative, suction pressure is produced in the chambers 80 during the step in which the article 1 to be transferred is picked up and held.

To release the article 1, the pressure in the chambers is returned to normal, atmospheric pressure.

All the components and elements described above are disposed between a pair of plates 53, 54 fixedly spaced from each other and between which there is a fixed supporting structure 51, adapted to support the elements and components, and a movable supporting structure 52, rotatably associated with the fixed supporting structure 51 and driven in rotation in order to rotate the movable elements and components.

In the example embodiment illustrated, the transfer unit 100 comprises eight arms 60 with pickup means 70 equally spaced round an ideal, intermediate circle concentric with the axis of rotation of the carousel 50.

It is understood that a different number of arms 60 and suction cups 71 is imaginable.

Whatever the case, with the configuration described above, when one of the pickup means 70 travels a stretch corresponding to an ideal inner circle concentric with the axis of rotation of the carousel 50 and corresponding to the first line 10, to pick up an article 1, the feed component which is parallel to the first line 10 involves a positive acceleration in the displacement of the pickup means 70, that is, of the suction cup 71, relative to the rotation of the carousel 50.

This is due to the simultaneous displacement in the same direction caused by the rotation of the respective arm 60, such that the relative speed between the pickup means 70 and the first line 10 is zero or almost zero.

On the other hand, when one of the pickup means 70 travels a stretch corresponding to an ideal outer circle concentric with the axis of rotation of the carousel 50 and corresponding to the second line 20, to release an article 1 previously picked up, the feed component which is parallel to the second line 20 involves a negative acceleration in the displacement of the pickup means 70 relative to the rotation of the carousel 50.

This is due to the simultaneous displacement caused by the rotation of the respective arm 60 in the opposite direction to that caused by the rotation of the carousel, such that the relative speed between the pickup means 70 and the second line 20 is zero or almost zero.

The proposed aims of the innovation are thus achieved.

Advantageously, the proposed unit 100 allows articles to be transferred quickly and easily between two lines which are angularly disposed to each other, specifically, between two lines disposed at 90°.

It is also noted that since the relative speed between the pickup means 70 and the two lines 10, 20 is substantially zero when the articles are picked up and released, the articles are not scraped against the lines while they are being picked up and released, thus avoiding damage to them.

It should be noted that the unit 100 allows transfer to be carried out between two lines 10, 20 operating at different speeds.

What is claimed is:

1. A transfer unit for transferring articles, comprising:
a first line, along which the articles are made to advance according to a first orientation,
a second line, perpendicular to the first line and along which the articles are made to advance according to a second orientation, rotated in the horizontal plane relative to the first orientation,
a rotary carousel including a set of pickup devices circumferentially distributed around the rotary carousel and driven to pick up the articles one after the other from the first line and, after rotating the rotary carousel through a predetermined circular arc, to place the articles on the second line, the rotary carousel being rotatable about a vertical axis,
arms respectively mounting the pickup devices to the rotary carousel, the arms being rotatably supported around a respective middle circle having an axis parallel to vertical axis of the rotary carousel, the pickup devices being driven in counter-rotation and in phase relationship with a rotation direction of the rotary carousel, such that, as the rotary carousel rotates, the pickup devices are made to move along an elliptic trajectory, and the pickup devices are in turn driven in counter-rotation relative to the respective arms such that an orientation of the pickup devices, and hence that of the articles transferred, remains constant in the horizontal plane while respective free ends of the arms rotate at the first line and the second line;
for each pickup device, a suction cup, a sleeve rotatably mounted on a free end of the corresponding arm, a first pinion fixed to the sleeve, a second pinion fixed in the horizontal plane relative to the rotary carousel and concentric with an axis of rotation of the arm, and a toothed belt connecting the first pinion and the second pinion such that rotation of the second pinion causes a rotation of the first pinion by an amount such as to compensate for a rotation of the sleeve due to the rotation of the arm, from which an effect of the rotation of the rotary carousel is subtracted.

2. The transfer unit according to claim 1, and further comprising, for each of the arms, a tubular support, a stem passing through the tubular support to support the tubular support, a hole in the rotary carousel in which top sections of the stem and the tubular support are positioned, wherein the each of the arms is radially fixed to a free bottom end of the tubular support.

3. The transfer unit according to claim 2, and further comprising:
a cam drum acting on the top sections of the tubular supports to cause the tubular supports to be lowered, when the pickup devices are to be moved close to the first line to pick up articles to be transferred, and then raised again when the pickup devices are to be moved close to the second line to release onto the second line the articles previously picked up,
a crown wheel coaxial with, and fixed to, the rotary carousel,
for each tubular support, a gear fixed to the tubular support and an idler gear engaged between the gear and the crown wheel, with the idler gear having a predetermined reduction ratio relative to at least one chosen from the crown wheel and the gear, such that rotation of the crown wheel causes counter-rotation of the tubular support and the respective arm mounted to the tubular support relative to the rotation direction of the rotary carousel to an extent such that the respective pickup device in a stretch where an article is picked up, has a rotation component which is parallel to the first line.

4. The transfer unit according to claim 1, wherein
the arm includes an internal hole extending into the arm, and a second hole,
the rotary carousel includes a base plate at a bottom of the rotary carousel and the base plate includes a circular chamber concentric with the axis of rotation of the arm,
the pickup device includes a bushing mounted rotatably in the circular chamber about an axis of rotation concentric with the axis of rotation of the arm,
the pickup device includes a duct slidably inserted into the second hole to allow the arm to make vertical movements, the duct being connected to the bushing,
wherein the sleeve is connected to the internal hole and the duct and to a negative suction pressure for picking up and holding one of the articles.

5. The transfer unit according to claim 1, wherein the transfer unit includes a pair of plates fixedly spaced from each other and between which are located:
a fixed supporting structure;
a movable supporting structure including the rotary carousel, the movable supporting structure rotatably associated with the fixed supporting structure and drivable in rotation;
wherein the rotary carousel includes:
a base plate at a bottom of the rotary carousel;
tubular supports mounted to the base plate and having bottom ends supporting the arms respectively;
a set of stems mounted vertically, protruding from the base plate and fitted rotatably on the tubular supports respectively;
a cam drum which is held fixed relative to the rotation of the rotary carousel and acting on the top ends of the stems to cause the stems to be lowered when the pickup devices are to be moved close to the first line to pick up articles to be transferred and then to be raised and lowered again to place the articles on the second line;
a crown wheel coaxial with and fixed to the rotary carousel;
gears respectively keyed to the tubular supports;
a set of idler gears engaging the crown wheel and the gears such that the rotation of the rotary carousel causes counter-rotation of the tubular supports, and hence of the respective arms, relative to the rotation direction of the rotary carousel;
a set of sealed circular chambers made in the base plate and concentric with respective axes of rotation of the tubular supports fitted around the stems, the circular chambers being open at bottoms thereof and containing respective bushings which are sealingly and rotatably inserted therein, the respective bushings supporting the tubular supports, the circular chambers being connected to a source of negative suction pressure;
internal holes made in the arms respectively and connected to the pickup devices respectively;
ducts including free ends inserted slidably into the internal holes respectively and connected between the pickup devices and the circular chambers respectively to activate a negative suction pressure at the pickup devices for picking up and holding the articles.

6. The transfer unit according to claim 1, wherein the arms are equally spaced around an intermediate circle concentric with the axis of rotation of the rotary carousel.

7. The transfer unit according to claim 1, wherein, when one of the pickup devices travels a stretch corresponding to an inner circle concentric with the axis of rotation of the rotary carousel and corresponding to the first line, to pick up an article, a feed component which is parallel to the first line involves a positive acceleration in the displacement of the one of the pickup devices, relative to the rotation of the rotary carousel due to a simultaneous displacement in the same direction caused by the rotation of the respective arm mounting the one of the pickup devices.

8. The transfer unit according to claim 1, wherein a feed component which is parallel to the first line involves a positive acceleration in a displacement of the pickup devices, relative to the rotation of the rotary carousel due to a simultaneous displacement in the same direction caused by the rotation of the respective arm such that a relative speed between the pickup devices and the first line is zero or almost zero.

9. The transfer unit according to claim 1, wherein, when one of the pickup devices travels a stretch corresponding to an outer circle concentric with the axis of rotation of the rotary carousel and corresponding to the second line, to release an article previously picked up, a component of a feed speed of the article which is parallel to the second line makes a relative speed between the pickup devices and the second line zero or almost zero.

10. The transfer unit according to claim 1, wherein the articles picked up from the first line one after the other are placed on the second line after a rotation of 90° of the rotary carousel.

11. A transfer unit for transferring articles, comprising:
a first line, along which the articles are made to advance according to a first orientation;
a second line, perpendicular to the first line and along which the articles are made to advance according to a second orientation, rotated in the horizontal plane relative to the first orientation;
a rotary carousel including a set of pickup devices circumferentially distributed around the rotary carousel and driven to pick up the articles one after the other from the first line and, after rotating the rotary carousel through a predetermined circular arc, to place the articles on the second line, the rotary carousel being rotatable about a vertical axis, the pickup devices including engagement surfaces respectively for engaging the articles;
arms respectively mounting the pickup devices to the rotary carousel, the arms being rotatably supported around a respective middle circle having an axis parallel to vertical axis of the rotary carousel, the pickup devices being driven in counter-rotation and in phase relationship with a rotation direction of the rotary carousel, such that, as the rotary carousel rotates, the pickup devices are made to move along an elliptic trajectory, and the pickup devices are in turn driven in counter-rotation relative to the respective arms such that an orientation of the pickup devices, and hence that of the articles transferred, remains constant in the horizontal plane while respective free ends of the arms rotate at the first line and the second line;
a pair of plates fixedly spaced from each other and between which are located:
a fixed supporting structure;
a movable supporting structure including the rotary carousel, the movable supporting structure rotatably associated with the fixed supporting structure and drivable in rotation;

wherein the rotary carousel includes:
  a base plate at a bottom of the rotary carousel;
  tubular supports mounted to the base plate and having bottom ends supporting the arms respectively;
  a set of stems mounted vertically, protruding from the base plate and fitted rotatably on the tubular supports respectively;
  a cam drum which is held fixed relative to the rotation of the rotary carousel and acting on the top ends of the stems to cause the stems to be lowered when the pickup devices are to be moved close to the first line to pick up articles to be transferred and then to be raised and lowered again to place the articles on the second line;
  a crown wheel coaxial with and fixed to the rotary carousel;
  gears respectively keyed to the tubular supports;
  a set of idler gears engaging the crown wheel and the gears such that the rotation of the rotary carousel causes counter-rotation of the tubular supports, and hence of the respective arms, relative to the rotation direction of the rotary carousel;
  a set of sealed circular chambers made in the base plate and concentric with respective axes of rotation of the tubular supports fitted around the stems, the circular chambers being open at bottoms thereof and containing respective bushings which are sealingly and rotatably inserted therein, the respective bushings supporting the tubular supports, the circular chambers being connected to a source of negative suction pressure;
  internal holes made in the arms respectively and connected to the pickup devices respectively;
  ducts including free ends inserted slidably into the internal holes respectively and connected between the pickup devices and the circular chambers respectively to activate a negative suction pressure at the pickup devices for picking up and holding the articles.

12. The transfer unit according to claim 11, wherein the pickup devices include suction cups connected to respective sleeves leading into the arms to connect the suction cups to corresponding ones of the circular chambers, the suction cups including the engagement surfaces respectively.

13. The transfer unit according to claim 11, wherein the arms are equally spaced around an intermediate circle concentric with the axis of rotation of the rotary carousel.

14. The transfer unit according to claim 11, wherein, when one of the pickup devices travels a stretch corresponding to an inner circle concentric with the axis of rotation of the rotary carousel and corresponding to the first line, to pick up an article, a feed component which is parallel to the first line involves a positive acceleration in displacement of the one of the pickup devices, relative to the rotation of the rotary carousel due to a simultaneous displacement in the same direction caused by the rotation of the respective arm mounting the one of the pickup devices.

15. The transfer unit according to claim 11, wherein a feed component which is parallel to the first line involves a positive acceleration in a displacement of the pickup devices, relative to the rotation of the rotary carousel due to a simultaneous displacement in the same direction caused by the rotation of the respective arm such that a relative speed between the pickup devices and the first line is zero or almost zero.

16. The transfer unit according to claim 11, wherein, when one of the pickup devices travels a stretch corresponding to an outer circle concentric with the axis of rotation of the rotary carousel and corresponding to the second line, to release an article previously picked up, a component of a feed speed of the article which is parallel to the second line makes a relative speed between the pickup devices and the second line zero or almost zero.

17. The transfer unit according to claim 11, wherein the articles picked up from the first line one after the other are placed on the second line after a rotation of 90° of the rotary carousel.

* * * * *